United States Patent [19]

Adamson

[11] 4,296,599
[45] Oct. 27, 1981

[54] TURBINE COOLING AIR MODULATION APPARATUS

[75] Inventor: Arthur P. Adamson, Cincinnati, Ohio

[73] Assignee: General Electric Company, Cincinnati, Ohio

[21] Appl. No.: 25,300

[22] Filed: Mar. 30, 1979

[51] Int. Cl.³ .............................................. F02C 7/18
[52] U.S. Cl. ................... 60/39.23; 60/39.75; 415/115; 415/116
[58] Field of Search ............ 60/39.75, 39.83, 726, 60/266, 39.29, 39.23; 415/115, 116, 175; 416/45

[56] References Cited

U.S. PATENT DOCUMENTS

| | | | |
|---|---|---|---|
| 2,811,833 | 11/1957 | Broffitt | 60/39.75 |
| 2,951,340 | 9/1960 | Howald | 60/39.75 |
| 3,584,458 | 6/1971 | Wetzler | 60/39.75 |
| 3,663,118 | 5/1972 | Johnson | 416/95 |
| 3,966,354 | 6/1976 | Patterson | 415/116 |
| 4,213,738 | 7/1980 | Williams | 415/115 |

FOREIGN PATENT DOCUMENTS

| | | |
|---|---|---|
| 1277980 | 6/1972 | United Kingdom . |
| 1286785 | 8/1972 | United Kingdom . |
| 1385903 | 3/1975 | United Kingdom . |

Primary Examiner—Robert E. Garrett
Attorney, Agent, or Firm—Dana F. Bigelow; Patrick M. Hogan; Derek P. Lawrence

[57] ABSTRACT

The cooling air flowpath for a turbomachine includes a plurality of valves placed in mutually parallel relationship to collectively provide for the modulation of the cooling airflow. Minimum flow requirements are assured while economizing on air to increase efficiency. Any single valve passes only a small portion of the total air so that a valve failure does not appreciably reduce the overall cooling function.

13 Claims, 8 Drawing Figures

TURBINE COOLING AIR MODULATION APPARATUS

BACKGROUND OF THE INVENTION

This invention relates generally to gas turbine engines and, more particularly, to means for modulating cooling airflow to the turbine component portions thereof.

As turbine inlet temperatures have been increased in order to improve the efficiency of gas turbine engines, it has become necessary to provide cooling air to the turbine blades and vanes in order to limit the temperatures of those components to levels which are consistent with the material properties thereof. At the higher operating speed conditions, such as at takeoff, the amount of cooling air that is required is relatively high, whereas during lower temperature operating conditions, such as at idle, there is relatively little, if any, cooling air required for the turbine components. However, for reasons of simplicity and safety, it has not been considered desirable to modulate the flow of cooling air to the turbine components. As a result, since the engine must be designed so as to provide the amount of cooling airflow required for maximum temperature operation, an excess amount of cooling air is provided during other operating conditions so as to thereby reduce the efficiency of the engine during those operating periods.

Generally, modulation of the cooling air by the use of valving has been avoided because of the possible consequences of valve failure. Not only has it been considered necessary that such a valve be fail-free or fail-safe, but also that the logic and equipment needed to operate the valve would also be trouble-free. A further complication is that the airflow path of the engine is often dispersed and buried deep in the engine where it is not readily available for valving.

It is, therefore, an object of the present invention to provide an improved cooling system for a turbine engine.

Another object of the present invention is the provision for improving the efficiency of a turbofan engine by modulating the cooling airflow therein.

Yet another object of the present invention is the provision in a turbomachine for modulating the cooling flow in a practical and safe manner.

Still another object of the present invention is the provision in a turbomachine for a cooling flow modulation system which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, there are provided in the cooling airflow system, a plurality of valves disposed in mutually parallel relationship so as to jointly provide for the modulation of the cooling airflow in accordance with predetermined schedules. In this way, only a small portion of the air passes through any single valve such that failure of any one valve will have a very small effect on the overall operation of the engine. Reliance on a number of valves operating in concert would thus allow the use of small, simple, lightweight valves to be used.

By another aspect of the invention, each of the valves includes a sensor for determining a predetermined operating characteristic of the engine and means for operating the valve in response to predetermined values of that operating parameter.

In the drawings as hereinafter described, a preferred embodiment and modified embodiments are depicted; however, various other modifications and alternate constructions can be made thereto without departing from the true spirit and scope of the invention.

DESCRIPTION OF THE PREFERRED EMBODIMENT

Figure 1:
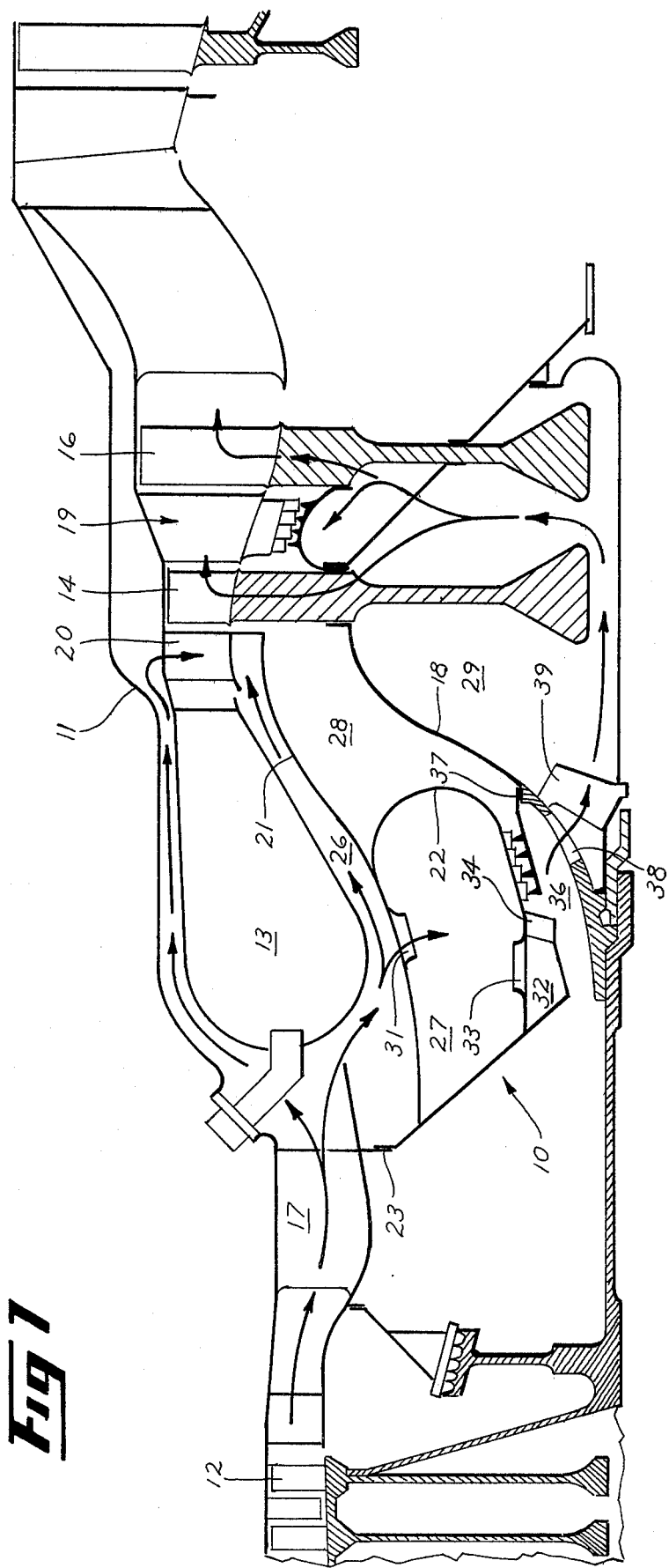
FIG. 1 is a schematic illustration of a portion of a gas turbine engine with the present invention embodied therein.

Referring now to FIG. 1, the invention is shown generally at 10 as installed in a turbomachine 11 having disposed in serial flow relationship a compressor 12, a combustor 13, a high pressure turbine 14, and a low pressure turbine 16. In conventional operation, the inlet air is pressurized by the compressor 12 and then passes through a diffuser 17. The major portion of the air is then passed into the combustor 13 where it is mixed with fuel and vaporized for burning with the discharged gases flowing to the high pressure turbine 14 for providing power to the compressor 12 by way of the shaft 18. The turbine discharge gases then pass through the downstream flowpath 19 to the low pressure turbine 16 which, in turn, provides power to a fan, or the like (not shown). The discharge gases from the low pressure turbine are then passed out the turbomachine exhaust nozzle.

A portion of the compressor discharge air passing through the diffuser 17 is circulated to cool the hot parts of the engine. Some of that air which surrounds the combustor 13 enters the walls of the combustor to cool the inner surfaces thereof by way of film cooling process. Other portions of that air are directed to enter the first stage vanes 20 from the radially outer side thereof so as to provide a cooling function by the impingement and diffusion processes. Still other parts of the compressor discharge air are conducted along the paths, as shown by the arrows, to cool the blades of the high pressure turbine 14. It will be recognized that during high power, high temperature operating conditions, there will be a substantial amount of air needed for this cooling process. However, there will be other periods of operation wherein smaller amounts of air are required and still others wherein there is no cooling air required. It is the intent of the present invention to modulate the cooling airflow in order to accommodate the cooling needs while, at the same time, economizing when possible in order to increase the efficiency of the engine.

Referring now to FIG. 1, the annular space located radially inward of the combustor 13 is compartmentalized by an inner combustor liner 21, a baffle 22, and the high pressure turbine shaft 18. The combustor liner 21, which interconnects the diffuser frame 23 and the high pressure turbine first stage vane 20, defines the radially inner side of the passage 26 which carries cooling air to the first stage vanes 20. The combustor liner 21 and the baffle 22 are interconnected to partially define a compartment 27, and those two elements, along with the high pressure turbine shaft 18, form in combination an annular cooling air chamber 28. Finally, there is a cavity 29, which is defined on its radially outer side by the shaft 18, for conducting the flow of cooling air to the high pressure turbine 14. It will be seen that the combustor liner 21 has formed therein a plurality of circumferentially spaced holes 31 for conducting the flow of air from the passage 26 to the compartment 27. To conduct the flow of cooling air out of the compartment 27 and into a passage 32, there are provided a plurality of circumferentially spaced apertures 33 formed in the baffle 22, as shown. The cooling air then passes from the passage 32 through a plurality of circumferentially spaced vanes 34 where it enters a cavity 36 defined in part by the rotating high pressure turbine shaft 18, the stationary baffle 22, and a rotating seal 37. Finally, there is provided in the high pressure turbine shaft 18 a plurality of circumferentially spaced holes 38 which provide fluid communication between the cavity 36 and a duct 39 leading to the cavity 29.

It will be recognized that in conventional turbomachines, the holes, apertures, and passages, described hereinabove, are sized for maximum cooling air requirements and are not varied in order to reduce cooling airflow when the requirements are reduced. It is the intent of the present invention to provide means for varying the flow through those passage means in order to accommodate the cooling needs while at the same time economizing where possible in order to increase the efficiency of the engine.

Modulation of the cooling air is accomplished by the installation of a plurality of relatively simple valves in any one or more of the sets of holes, apertures, or ducts 31, 33, 34, 38, or 39, described hereinabove. That is, the valves are installed in parallel relationship such that in combination they control all or substantially all of the cooling airflow, but singularly they each control a very small percentage of the overall flow. In this way, failure of an individual valve does not substantially affect the overall performance of the combination.

Figure 2:
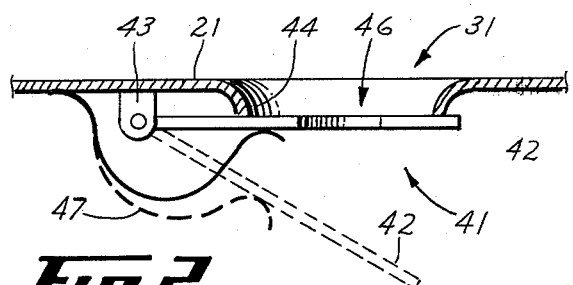
FIG. 2 is a schematic illustration of a valve in accordance with a preferred embodiment of the invention.

There is shown generally at 41 of FIG. 2 a valve arrangement which has been applied to the plurality of holes 31. It comprises a flap 42 which is hingedly mounted at its one edge to a pivot 43 in such a way that when it is in the closed position it engages the flange 44 of the hole 31, as illustrated by the solid line position, so as to block off the flow of air. When it is in the open position, as shown by the dotted line illustration, it allows the cooling air to freely flow through the hole 31. In order to ensure that a given amount of cooling air is always flowing within the system, an opening 46 may be provided in the flap so as to allow for the flow of air therethrough even when the flap 42 is in the closed position. The sizing of the opening 46 is determined by the minimum required cooling airflow.

Provision for opening and closing the valve flap 42 is preferably an automatic mechanism which operates each of the valve flaps 42 individually in response to predetermined operating parameters of the turbomachine. One such engine operating parameter that may be used is the pressure of the cooling airflow. This is accommodated by the use of a biasing spring 47 which biases the flap 42 toward a closed position. When the cooling air pressure is high, as will be the case when the engine speed is high, the spring bias will be overcome and the flap 42 will be moved to the opened position by the pressure of the air. As the air pressure is decreased, the flap 42 will move toward the closed position until finally, when the air pressure has decreased to a predetermined minimum level, the flap will be in the closed position to allow only the minimum amount of cooling airflow through the opening 46.

Figure 3A:
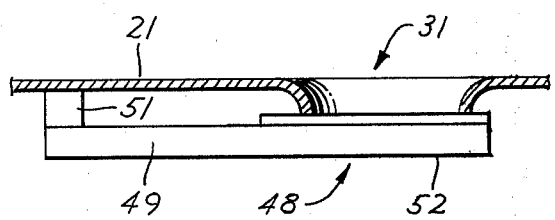
FIGS. 3A and 3B are schematic illustrations of a modified embodiment of the valve portion of the invention.
Figure 3B:
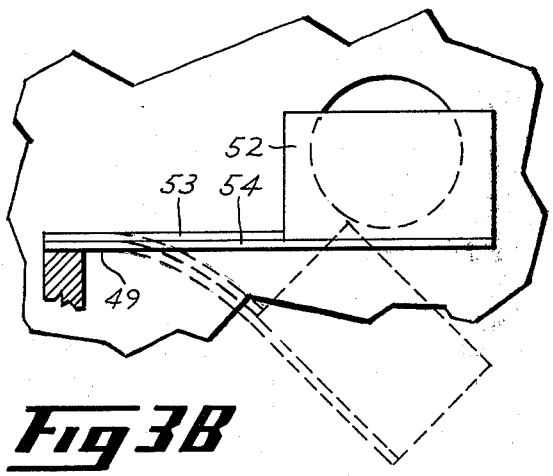

Another operational parameter which may be used for control of the valves is that of the temperature of the cooling air. In FIGS. 3A and 3B, there is shown generally a valve mechanism 48 which is responsive to such a temperature parameter. A bimetal arm 49 is rigidly attached at its one end to a post 51 and at its other end to a shutter 52 which substantially covers the hole 31. Shutter 52, when in the closed position, does not cover the entire hole 31 so that a minimum amount of cooling air is allowed to flow at all times. The arm 49 is a laminated structure comprising two portions 53 and 54 having different coefficients of expansion such that a variation in temperature will cause a differential growth pattern and a resulting sliding of the shutter 52 to vary the exposure of the hole 31. At a predetermined high temperature, the shutter will be entirely open, and at a predetermined low temperature, it will be in the closed position with only the minimum amount of cooling air flowing through the holes 31.

Figure 4:
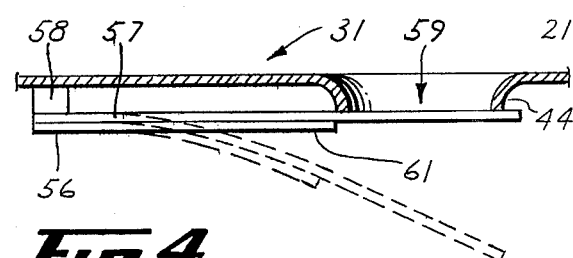

FIG. 4 illustrates a valve arrangement which is responsive to both temperature and pressure. The valve arm 56 comprises a first element 57 which is attached at its one end to a post 58 and engages at its other end the hole flange 44 to block off the flow of air, except for the minimum flow which passes through the hole 59. A second element 61 having a substantially lower thermocoefficient of expansion than that of the first arm element 57, is attached to the first arm 57 and the combination provides a thermoresponsiveness to the valve. At low temperatures and low pressures, the pressure acting on the arm 56 is at a minimum, and the mated lengths of the first and second elements are substantially equal such that the valve arm 56 is in the closed position, as shown by the solid line representation. When the temperature and pressure are increased, the pressure tends to force the arm to spring out away from the flange 44, while at the same time the relative thermalgrowth of the first and second elements also tends to open the valve arm, as shown by the dotted lines. In this way, the two parameters of temperature and pressure work together to operate the valve.

Figure 5:
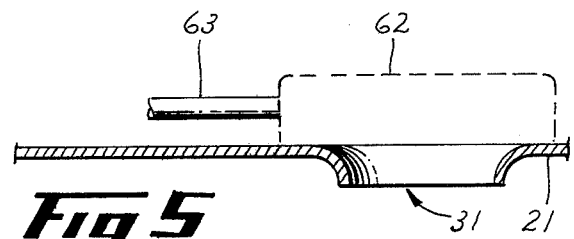
FIGS. 4–7 are schematic illustrations of alternate embodiments of the valve apparatus.

Instead of the passive systems hereinabove described wherein the valve reacts to pressure/temperature conditions existing within the manifold, the valves may instead be made to operate in response to signals initiated from outside the system. Such an arrangement is shown in FIG. 5 wherein a fluidic valve 62 is connected to an outside control system by a line 63. A pressure signal can then be transmitted to the fluidic valve 62 by an outside control system to modulate the valve in accordance with a predetermined schedule. A similar approach would be to use electrically or pneumatically operated valves which operate in response to electrical or air signals generated in the control system and transmitted along lines.

Figure 6:
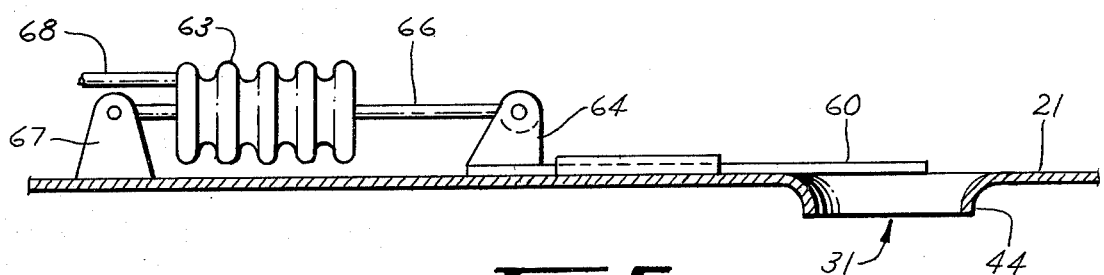

Another valve embodiment is shown in FIG. 6 wherein a valve gate 60 is slidably placed on the outer side of the hole 31 and is translated by a bellows 63 in order to vary its position with respect to the hole 31.

The bellows 63 is attached at its one end by a link 66 to a boss 64 on the gate 60 and at its other end by linkage to a base 67. Generally, as the pressure of the cooling air rises, the bellows tends to shrink and open the gate, and when the pressure is reduced, the bellows tends to expand and close the gate 60.

In its simplest form, the bellows of the above-described arrangement is sealed and is passive in nature with no vent required. Another approach is to provide a vent 68 for the bellows so as to provide bellows leak indication for troubleshooting and safety purposes. Yet another approach might be to connect the vent 68 to a controlled source of higher pressure to permit valve operation as desired from an external logic source. Other approaches might include use of a sealed bellows 63 containing high pressure gas which would be sensitive to both temperature and pressure, or a sealed bellows with a fluid inside which is responsive to different temperatures in accordance with a predetermined schedule.

Figure 7:
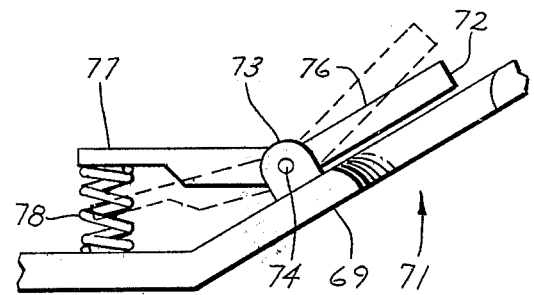

Although the valve mechanisms as described hereinabove are shown to be used in combination with the plurality of holes 31, it should be understood that they may be placed in any one or more of the locations shown in FIG. 2. Further, there may be various combinations such as, for example, a number of valves used in the apertures 33 coupled with the use of valves in a number of the holes 38. It should also be understood that some of the schemes shown hereinabove would be usable for modulating the flow of cooling air through holes formed in rotating parts. Another method, suitable only for rotating parts, is shown on FIG. 7. In that arrangement, a rotating part 69 has a plurality of holes 71 formed therein for the conduct of cooling air. An angled flap 72 is rotatably mounted to one side of the rotating part 69 by a clevis 73 and pin 74 in such a position that its free end 76 substantially covers the hole 71 when in the closed position while its lever end 77 is biased outwardly by a compression spring 78 so as to bias the flap 72 towards a closed position. As the speed of the rotating parts 69 increases, the centrifugal force acting on the flap 72 also increases and tends to overcome the bias of the compression spring 78 and move the flap 72 towards a more open position, as shown by the dotted lines. In addition to the speed considerations, the pressure of the cooling air will also be a factor since it acts on the free end 76 of the flap 72. Thus, the valve mechanism would have to be designed with both speed and pressure parameters in consideration.

While the present invention has been disclosed with particular reference to a preferred and modified embodiments thereof, the concepts of this invention are readily adaptable to other embodiments, and those skilled in the art may vary the structure thereof without departing from the essential spirit of the present invention. For example, while the invention has been described in terms of use with the flow of cooling air to the high pressure turbine components, it may just as well be employed for use in other areas of the engine as, for example, in the turbine vanes or shrouds. Other variations will also occur to those skilled in the art. It is contemplated that such variations are within the scope of the appended claims.

What is claimed as new and desired to be secured by Letters Patent of the United States is:

1. An improved turbomachine cooling air delivery system of the type having a source of cooling air and an air delivery channel for fluidly connecting the air delivery system to machine components to be cooled, wherein the improvement comprises a plurality of valves disposed in mutually parallel relationship in the air delivery channel and means for automatically operating each of said valves individually in response to predetermined conditions of said cooling air for thereby selectively varying the amount of cooling airflow in said air delivery channel.

2. An improved turbomachine cooling air delivery system as set forth in claim 1 wherein said automatic operating means is responsive to the temperature of the cooling air.

3. An improved turbomachine cooling air delivery system as set forth in claim 1 wherein said automatic operating means is responsive to the speed of the turbomachine.

4. An improved turbomachine cooling air delivery system as set forth in claim 1 wherein the means for operating said valves includes biasing means for biasing the valves toward a closed position.

5. An improved turbomachine cooling air delivery system as set forth in claim 2 wherein said automatic operating means includes a bimetal element which moves in response to temperature variations.

6. An improved turbomachine cooling air delivery system as set forth in claim 3 wherein said automatic operating means includes rotating parts subject to centrifugal forces.

7. An improved turbomachine cooling air delivery system as set forth in claim 1 wherein each of said valves further includes an opening therein sized for providing a predetermined minimum amount of cooling airflow during all periods of operation.

8. A cooling air delivery system as set forth in claim 1 wherein said plurality of valves are responsive to the temperature of the cooling air.

9. A cooling air delivery system as set forth in claim 1 wherein said plurality of valves are responsive to the speed of the turbomachine.

10. A cooling air delivery system as set forth in claim 1 wherein said plurality of valves are responsive to both temperature and pressure operating parameters.

11. A cooling air delivery system for a turbomachine comprising:
    (a) means for producing a flow of cooling air;
    (b) means for conducting said flow of cooling air to a component to be cooled;
    (c) an apertured partition disposed in and forming part of said flow conducting means; and
    (d) a plurality of valves disposed in the apertures for regulating the flow of cooling air therethrough, at least one of said valves including a flap pivotally connected to said partition so as to cover one of said apertures when the valve is in a closed position.

12. A cooling air delivery system as set forth in claim 11 wherein said flap has a hole formed therein for providing a minimum flow of cooling air during all periods of operation.

13. A cooling air delivery system as set forth in claim 11 wherein each of said valves is individually and automatically operable in response to the pressure of the cooling air.

* * * * *